Dec. 19, 1933.  A. LICHTERMAN  1,939,906
APPARATUS FOR DISPENSING MILK
Filed Jan. 25, 1932  2 Sheets-Sheet 2
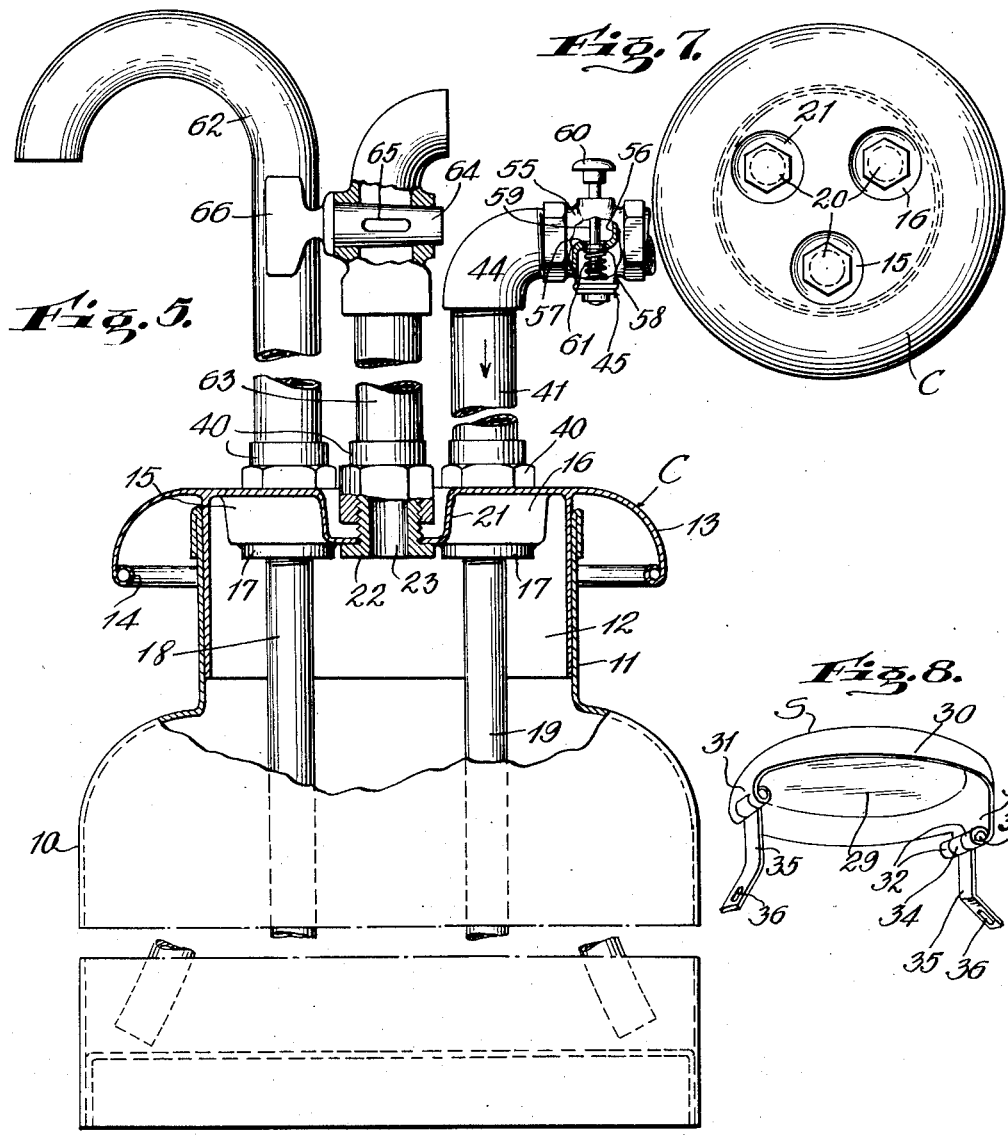
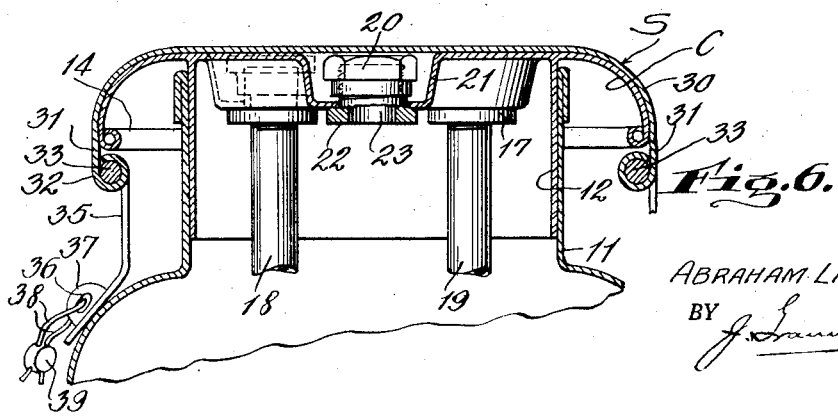
INVENTOR.
ABRAHAM LICHTERMAN
BY
ATTORNEY Patented Dec. 19, 1933

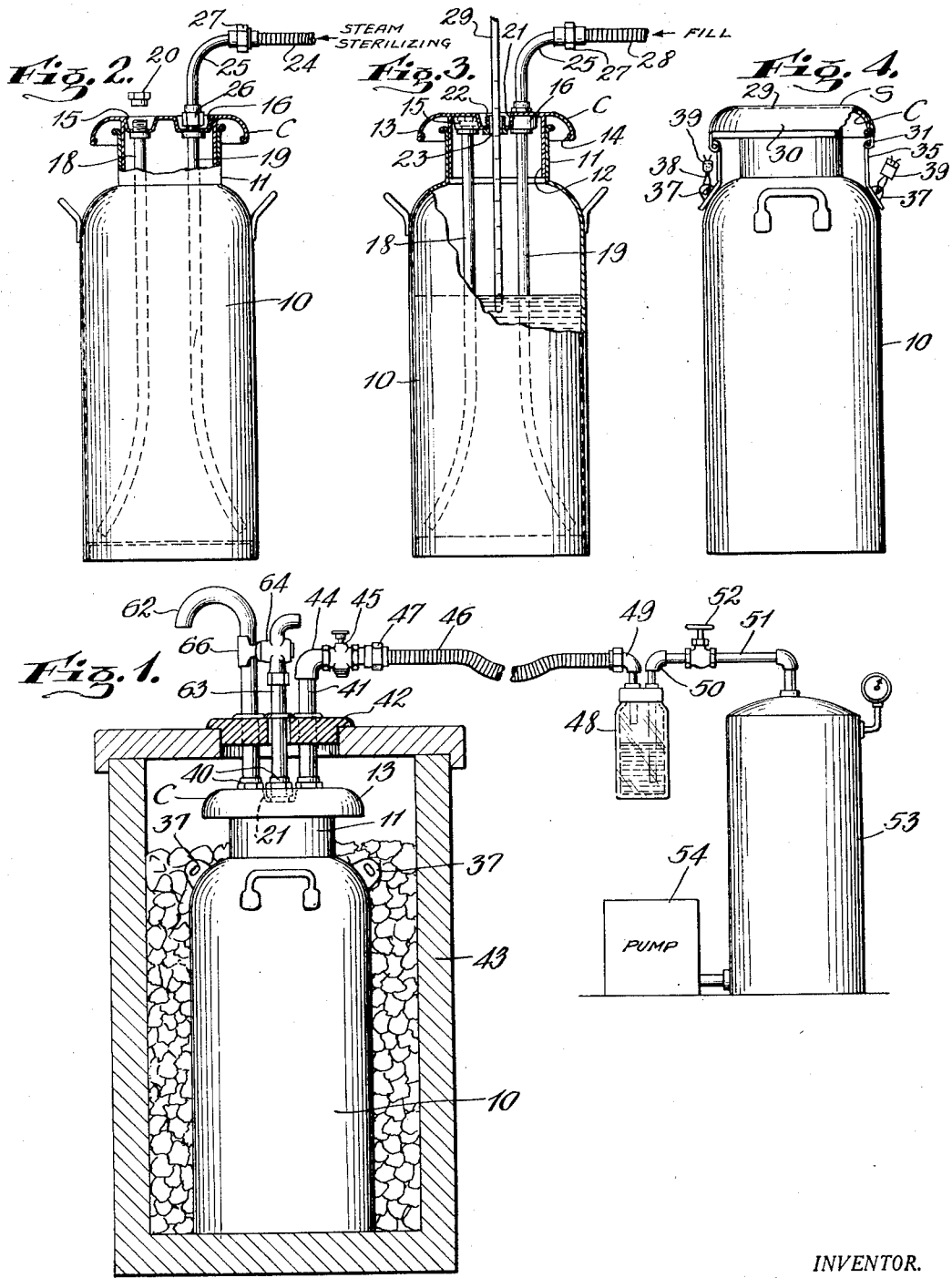

1,939,906

UNITED STATES PATENT OFFICE 1,939,906

APPARATUS FOR DISPENSING MILK

Abraham Lichterman, New Rochelle, N. Y.

Application January 25, 1932. Serial No. 588,777

4 Claims. (Cl. 221—74)

My invention relates to apparatus for and method of packing and dispensing milk.

There has been considerable agitation over the question of the sale of loose milk, that is, unbottled milk sold from large cans which are sterilized at the source of supply and then filled and shipped to the dealers in the cities. The retail vendors sell the milk to customers in small quantities so that the large cans of milk often stand in the retail store for a considerable period of time before all of the milk is sold. In most localities the law requires that the contents of the can must be agitated before each sale, so that the butter fat and milk solids will be evenly distributed in order that each person shall obtain the same proportion of butter fat and milk solids. The retail vendors usually employ a dipper to dispense the milk as the dipper can be conveniently used to agitate the milk at the time of making each sale. The dippers frequently become contaminated and dirty, and the cans quite frequently are left standing uncovered in stores where sanitary conditions are not strictly maintained. Loose milk when stored and dispensed in such manner and under such conditions has been found to be quite a potential health hazard.

In most eating places and at soda fountains, it is quite usual to insert into the can a manually operated pump, so that the milk for beverage purposes can be pumped directly into a receptacle. While these pumps are convenient they embody a number of movable parts and are not easily cleaned and sterilized. Then too, parts of these pumps are plated with metal which is not affected by lactic acid normally present in milk and when the plating wears off the metal which is affected by the lactic acid is exposed and contacted by the milk and is attacked by the lactic acid and the milk is adversely affected. Inasmuch as the pumps do not agitate the contents of the can they are not suitable for use except at soda fountains and in restaurants.

The use of dippers and manually operable pumps in dispensing milk necessarily places the responsibility for cleaning and sterilizing them on the retail vendors who often totally fail to sterilize the dippers or pumps and more often improperly clean and sterilize them.

The objects of the present invention include the provision of apparatus of simple construction which can be utilized in sterilizing and filling the can at the milk plant, dispensing the milk at the retail vendor's establishment, and embodying no movable parts within the can for contact with the milk, but having the parts with which milk comes in contact readily accessible for thorough cleaning and sterilization at the source of supply.

Another object of the invention is to provide apparatus of the above character to be used in sterilizing of the can, in filling the can, and in dispensing the milk without the necessity of removing the cover from the can to expose its contents between the time that the can is filled and the last bit of milk has been dispensed, and without bringing the hands or collateral implements into contact with the milk.

Another object of the invention is to provide in connection with a container for the above purpose, means for dispensing the milk by pressure and to utilize such dispensing force for the purpose of agitating the contents of the container from time to time, and without removing the cover from the can to assure each customer receiving proper proportion of milk solids and butter fat.

Another object of the invention is to provide in connection with a container of the above type an auxiliary closure which can be readily applied and sealed on the can to positively prevent tampering with the dispensing parts and contents of the container or exposure of the contents at any time from the filling and shipping of the can until the time that it is delivered to it ultimate destination and there opened and connected with the dispensing mechanism.

The foregoing and other objects and advantages of the invention will become apparent and will be pointed out during the course of the following detailed description of a preferred embodiment of the invention illustrated in the accompanying drawings in which Fig. 1 is an elevation of the arrangement of the parts utilized in the dispensing and showing in cross section a storage tank with a container embodying the invention therein;

Fig. 2 is a view in elevation with parts broken away of a container embodying the invention with the sterilizing attachment applied thereto;

Fig. 3 is a view similar to Fig. 2 showing the container in one stage of the filling operation;

Fig. 4 is a view similar to Figs. 2–3 showing the auxiliary closure applied to the container;

Fig. 5 is an enlarged detail view in elevation of the container and dispensing attachments with parts broken away;

Fig. 6 is an enlarged detail view showing the parts as applied in Fig. 4;

Fig. 7 is a top plan view of the inner cover; and

Fig. 8 is a perspective view of the auxiliary or outer sealing closure.

Referring to the drawings, and particularly to Figs. 1 and 5, the numeral 10 designates a milk can of usual construction having a neck 11 which receives the skirt 12 of the cover C which has an outwardly and downwardly curved annular flange 13 terminating in an inwardly directed bead 14. The top of the cover is provided with cup-shaped portions 15 and 16 (Fig. 5) the bottom walls of which are relatively thick at 17 and provided with screw threaded openings to receive the pipes 18 and 19 which extends down through the can to points adjacent its bottom, the pipes extending toward the sides of the can for a purpose hereinafter pointed out. As shown in Fig. 2, the screw threaded ends of the pipes 18 and 19 extend up into the interior of the portions 15 and 16 respectively and are adapted to receive internal threaded caps 20 hereinafter described. There is also provided in the top of the cover a third cup-shaped depression or portion 21 through the bottom of which is mounted a screw 22 having its screw threaded shank disposed within the depression and being provided with a central bore or opening 23 communicating with the interior of the container.

Referring to Fig. 2 the container is shown connected to a conduit 24 leading from a source of steam, not shown, by the goose neck 25 which is coupled to the pipe 19 by the nipple 26 and to the conduit 24 by the nipple 27. Such a connection would be made at the source of supply so that steam at a temperature sufficient to sterilize the can could be forced through the conduit 24 and goose neck 25 and pipe 19 to the interior of the can after the can has been washed and before the can is to be filled with the milk.

Referring to Fig. 3, which illustrates the manner of filling the can, it will be noted that the goose neck 25 is connected by the coupling 27 to a conduit 28 leading to the tank in which the milk is contained. A float gauge 29 is inserted into the can through the opening 23 in the nut 22 so that as the milk is fed into the can through the pipe 28, goose neck 25, and pipe 19, the gauge will indicate by its position relative to the top of the cover when the milk has reached the proper level in the container. The can thus sterilized and filled is now ready for shipment and the coupling 26 is removed and caps 20 are screwed on to the ends of the pipes 18 and 19 and on to the shank of the screw 22 to completely close the can as as shown in Fig. 7. The can thus closed can be tampered with or the caps 20 loosened to expose the milk to different atmospheric conditions during the shipment, and to prevent this, I provide the auxiliary locking closure S shown in Fig. 8 and having a substantially flat top portion 29 to cover the depressions 15, 16, and 21 and the caps 20 and a downwardly extending curved flange 30 similar in configuration to the flange 13 to engage thereover and having depending extensions 31, the lower ends of which are bifurcated to provide arms 32 which are bent back upon themselves to form keepers for a pin 33 mounted therethrough and through the looped end 34 on the end of hasp 35, the lower end of the hasp being bent outwardly and provided with openings 36 to engage over eyes 37 on the shoulders of the can, as shown in Fig. 4, whereby the closure may be sealed on to the can by running wires 38 through the eye 37 and securing the ends of the wires together by a lead seal 39. The resilience of the portions 31 permits the hinges to snap in below the edge of flange 13 and to be pulled out for removal of closure S.

The can thus sealed is shipped and when it reaches its ultimate destination or the place where the milk is to be dispensed and sold, the wires 38 are broken and the closure removed to expose the caps 20. These caps are then unscrewed from the pipe and nipples 40 similar to the nipples 26 and are applied to the screw threaded ends of the pipes 18 and 19 (Figs. 1 and 5) to connect the pipe 19 with a pipe 41 which extends through the cover 42 of the cabinet 43, if it is desired to keep the container in such cabinet for the purpose of keeping the milk cold. The pipe 41 is connected to a nipple 44 which in turn is connected to the valve 45 attached to the conduit 46 by a coupling 47. Conduit 46 is adapted to convey air under pressure from an air sterilizing or cleansing receptacle 48 to which the conduit 46 is connected at 49. The cleansing or sterilizing medium for the air may comprise any fluid or other medium suitable for the purpose, and as shown in Fig. 1, the receptacle 48 is connected by coupling 50 to a pipe 51 in which may be located a manually controlled valve 52, the pipe 51 leading to a tank 53 adapted to receive compressed air from the compressor or pump 54.

Referring to Fig. 5, it will be noted that the valve 45 is preferably of the quick acting plunger actuated type and comprises a casing 55 within which is the web 56 having a port 57 chamfered to provide a seat for the valve head 58 mounted on a stem 59 which projects outwardly through the casing and has at its end a knob 60. The valve head 58 is normally biased or held in closed position against port 57 by the coil spring 61 in known manner.

Referring to Figs. 1 and 5, it will be noted that another of the nipples 40 is attached to the pipe 18 at one end and to a dispensing spout 62, while the screw 22 receives the third nipple which is also connected to a pipe 63 similar to pipe 41 and in which is mounted a turn cock 64 having the usual escapement opening 65 to be brought into and out of registry with the passage through the pipe which communicates with the bore 23 of the nut 22 and hence with the interior of the container. The turn cock 64 is manually operable by means of the head 66.

It will be understood that the dealer has the compressed air apparatus and its connections and the air filtering device at a convenient point in his store for ready connection and disconnection to and from the container, and that the spout and pipe 63 with its turn cock 64 are also retained by him. With this in mind, when the can is received in the condition shown in Fig. 4, he simply breaks the seal, removes the auxiliary cover S and caps 20, and screws the nipples 40, which are associated with the respective pipes 41 and 63 and spout 62, on to the ends of the pipe 19, screw 22, and pipe 18 respectively. Inasmuch as pipes 18 and 19 are substantially identical in construction and extent the spout and pipe 41 can be connected to either. The first thing the vendor should do is to open the turn cock 64, depress the knob 60 on the valve 45 so that the air coming into the can under pressure and being discharged at the bottom of the can will agitate the contents at the can to mix the cream and milk, it being apparent that as long as the turn cock 64 is open the air after passing through the milk will pass out through the bore 23 and pipe 63 and opening 64. The pipes 18 and 19 are flared toward the side of the can to thoroughly mix the contents by directing the air toward the side rather than discharging it at the middle of the can as in the latter case the air would bubble right up through the milk only at the center.

As has been explained, loose milk is sold to customers who bring their own receptacles, and although it is impossible to regulate the sterilization of these receptacles in the home, just as it is impossible to regulate the care of bottled milk after it has been delivered to the home where it can so easily become contaminated, it is possible to dispense loose milk in a sanitary manner as above explained, and to complete the process in harmony with the aims of this invention, the vendor will have a graduated measuring receptacale which can be easily and thoroughly cleansed and sterilized, such receptacle being preferably made of glass so as not only to readily exhibit the quantity of milk but also to show the condition of the receptacle. When a customer presents a receptacle, the vendor will use his own graduated receptacle to measure the milk and he will hold his receptacle beneath the spout 62, close the valve 64, open the valve 45 to admit air into the receptacle through the pipe 19. Although the milk may have been previously agitated it will be obvious that even with the valve 64 closed and the air issuing through the pipe 19, there will be further agitation and at the same time a pressure will be built up in the top of the can above the contents to force the milk up through the pipe 18 and out of the spout 62 into the graduated receptacle. When the proper quantity has been dispensed the dealer will pour the milk from his receptacle into the customer's receptacle.

It should be apparent from the foregoing that a storekeeper dealing in loose milk can dispense the same in a sanitary manner, as he receives pasteurized milk in a sterilized container which has been tightly sealed from the time it was filled until the time of delivery at his store, and which is also closed to exclude foreign matter after he has connected the dispensing apparatus with the elements provided therefor on the can. It should also be obvious that the invention is well adapted to use in restaurants and at soda fountains in the manner and under the conditions above specified and will obviate the objections inherent in the use of manually operated pumps as there is no wear on the conduits which contact the milk and the plating thereon which is not subject to attack by lactic acid.

It will be understood that when all of the milk has been dispensed from the can the retail dealer disconnects the spout 62, pipes 63 and 41 simply by unscrewing the nipples 40, replaces the caps 20 and the closure S, and the can with all of these parts attached thereto is sent back to the source of supply for cleansing, sterilizing, refilling, and resealing, as hereinabove described.

What I claim is:

1. Apparatus for dispensing milk from bulk comprising a source of compressed air, a container for the milk, a conduit leading from the source of compressed air, a pipe in the container terminating adjacent the bottom, a connection between said pipe and conduit whereby air may be admitted to the bottom of the container, a second pipe in the container leading from adjacent the bottom thereof, a spout connected to said second pipe outside of the container to dispense milk under pressure created in the container by the air, an air escapement port at the top of the container to permit agitation of the milk without dispensing it, a valve to open and close said port, and a valve to control the flow of air from said source into the container.

2. Apparatus for dispensing milk from bulk comprising a source of compressed air, an air filter, a container for the milk, a conduit leading from the source of compressed air into the filter, a pipe in the container terminating adjacent the bottom thereof, a connection between said pipe and filter, a second pipe in the container leading therefrom, a spout on said second pipe, an air escapement port at the top of the container, a valve to open and close said port, and a valve to control the flow of air from said source into the container, said first valve being operable to permit agitation of the milk by the air without dispensing and to effect dispensing at will.

3. In a shipping and dispensing container for milk, a cover, pipes carried by said cover extending into the container and terminating adjacent the bottom thereof, a coupling to connect one of said pipes to a source of compressed air, a spout on said other pipe, an air escapement port in said cover, a valve to open and close said port, and a valve to control the admission of compressed air into the container, said first valve being operable to permit agitation of the milk by the air without dispensing and to effect dispensing at will.

4. Apparatus for dispensing milk from bulk comprising a source of compressed air, a container, a closure for the container having recesses in its top, pipes extending into the container and having their upper ends disposed in said recesses and their lower ends adjacent the bottom of the container, a connection between said source of compressed air and the top of one of said pipes, a valve for controlling the flow of air through said connection and pipe into the receptacle, a spout connected to the top of said other pipe to emit milk when air is admitted to the receptacle, a vent, and means for opening said vent to permit agitation of the milk by the entering air without dispensing it and to close said vent to permit dispensing of the milk.

ABRAHAM LICHTERMAN.